United States Patent
Woo

(10) Patent No.: US 6,193,250 B1
(45) Date of Patent: Feb. 27, 2001

(54) CAMBER ANGLE CONTROL TYPE SUSPENSION SYSTEM

(75) Inventor: Seung-Hoon Woo, Kunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/471,772

(22) Filed: Dec. 23, 1999

(30) Foreign Application Priority Data

Aug. 19, 1999 (KR) .................................................. 99-34309

(51) Int. Cl.[7] .............................. B60G 3/20; B60G 11/14; B60G 21/055
(52) U.S. Cl. ............................ 280/124.107; 280/124.116; 280/124.128; 280/124.134; 280/124.152; 280/124.179
(58) Field of Search ..................... 280/124.116, 124.128, 280/124.134, 124.15, 124.152, 124.153, 124.179, 124.107, 124.109, 124.11, 788

(56) References Cited

U.S. PATENT DOCUMENTS

| | | | |
|---|---|---|---|
| 2,831,545 | * 4/1958 | Christiano | 280/124.128 |
| 3,586,346 | * 6/1971 | Sautter | 280/124.153 |
| 3,610,655 | * 10/1971 | Barenyi et al. | 280/124.116 |
| 3,729,210 | * 4/1973 | Cunningham, Jr. | 280/124.109 |
| 4,491,341 | * 1/1985 | Maebayashi | 280/124.128 |

* cited by examiner

Primary Examiner—Peter C. English
(74) Attorney, Agent, or Firm—Christie, Parker & Hale, LLP

(57) ABSTRACT

A camber angle control suspension system includes left and right swing arms having ends connected to left and right axle shafts, and a trailing arm having opposite ends with downwardly bent elbows which are pivotally connected to the swing arms. The trailing arm is rotatably connected to a vehicle body by rotatable bushings mounted on the trailing arm. Shock absorbers are interposed between the swing arms and the vehicle body so as to make a connection therebetween, and springs are coiled around the shock absorbers. A stabilizer bar is fixed at opposite ends to the swing arms and connected to the vehicle body by rotatable bushings at a center portion thereof.

1 Claim, 2 Drawing Sheets

CAMBER ANGLE CONTROL TYPE SUSPENSION SYSTEM

BACKGROUND OF THE INVENTION (a) Field of the Invention

The present invention relates to a vehicle suspension and, in particular, to a suspension system capable of optimally controlling camber angle according to vehicle condition.

(b) Description of the Related Art

A suspension system is designed to provide the best combination of ride quality, directional control, ease of handling, safety, stability, and service life. Particularly, the front suspension system makes provision for turning the front wheels both right and left, as well as for straight-ahead directional control. Also, the front suspension system absorbs most of the braking torque caused by weight transfer during braking.

In modern vehicles equipped either with a MacPherson type or a double-triangle type suspension, the camber angle of the front wheels has an important relationship with the behavior of the vehicle. Generally, in most suspension systems of the prior art, the camber angle is zero or very small for ideal contact between the tire and the ground.

However, if a suspension system is designed to have no camber angle while the vehicle is being driven straightforward, camber angle is generated when the vehicle turns, and it varies as the turning radius varies. If the suspension system is designed to have no camber angle during turning of the vehicle, there exists a camber angle when the vehicle runs in a straightforward direction.

Accordingly, in these prior suspension systems, it is impossible to obtain both straightforward running stability and turning stability with the same front suspension geometry.

SUMMARY OF THE INVENTION

The present invention has been made in an effort to solve the above problems of the prior art.

It is an object of the present invention to provide a camber angle control type suspension system capable of maintaining an ideal contact surface between the tire and the ground regardless of the vehicle's directional condition and uneven road surface conditions.

To achieve the above object, a camber angle control type suspension system includes left and right swing arms, each connected at one end to a respective left and right axle shaft, a trailing arm having opposite ends with downwardly bent elbows, which are pivotably connected to the swing arms, the trailing arm being rotatably connected to the vehicle body by means of rotatable bushings mounted on the trailing arm, shock absorbers interposed between the swing arms and the vehicle body so as to make connection therebetween, springs coiled around the shock absorbers, and a stabilizer bar fixed at opposite ends to the left and right swing arms and connected to the vehicle body by means of rotatable bushings at a center portion thereof.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
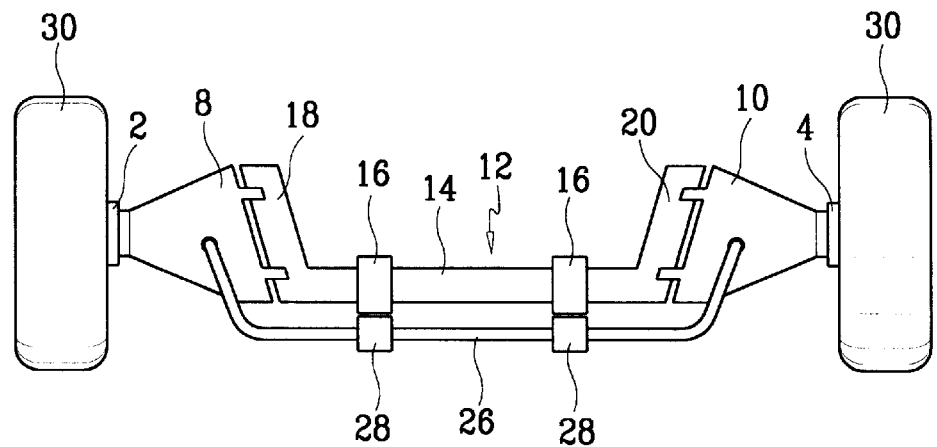
FIG. 1 is a top view showing a suspension system according to a preferred embodiment of the present invention.
Figure 2:
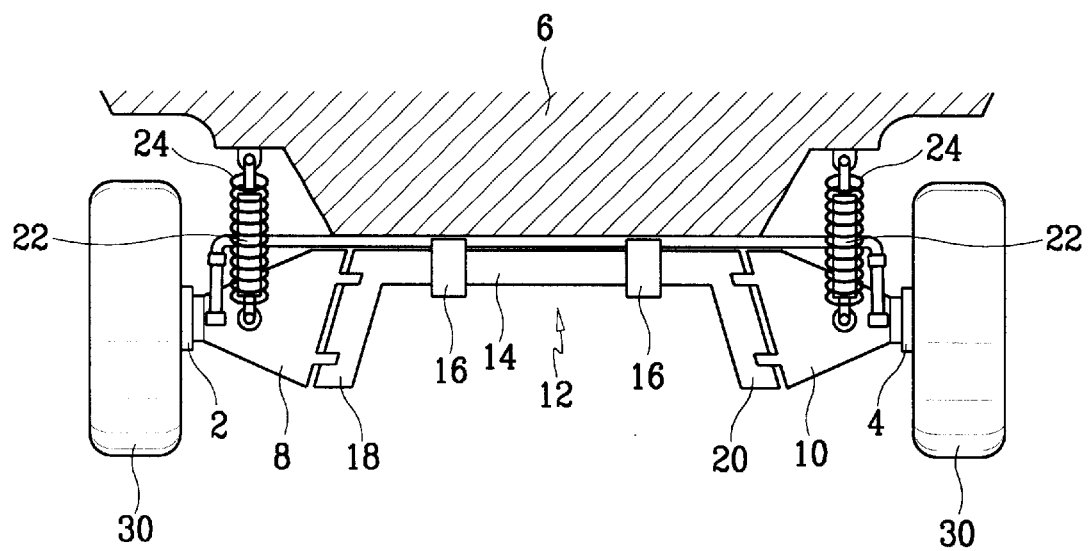
FIG. 2 is a front view of the suspension system of FIG. 1.

FIG. 1 and FIG. 2 are respective top and front views showing a camber angle control type suspension system according to a preferred embodiment of the present invention.

As shown in FIG. 1 and FIG. 2, the camber angle control type suspension system is provided between left and right axle shafts 2 and 4 and a vehicle body 6 so as to absorb both the impact from uneven road surfaces as well as braking torque, and comprises left and right swing arms 8 and 10 respectively connected to the left and right axle shafts 2 and 4, a trailing arm 12 having elbows 18 and 20, which are to be pivotably connected to the swing arms 8 and 10, bent downward therefrom, also the trailing arm 12 being rotatably connected to the vehicle body by means of rotatable bushings 16 mounted on a center portion 14 of the trailing arm 12.

Also, shock absorbers 22 and coil springs 24 wound around the shock absorbers 22 are interposed between the swing arms 8 and 10 and the vehicle body 6 so as to make a connection therebetween (see FIG. 2). A wide U-shaped stabilizer bar 26 is fixed at opposite ends to the left and right swing arms 8 and 10 and connected to the vehicle body 6 by means of rotatable bushings 28 at a center portion of the bar 26.

The operation of the camber angle control type suspension system described will be explained hereinafter with reference to FIG. 3 and FIG. 4.

Figure 3:
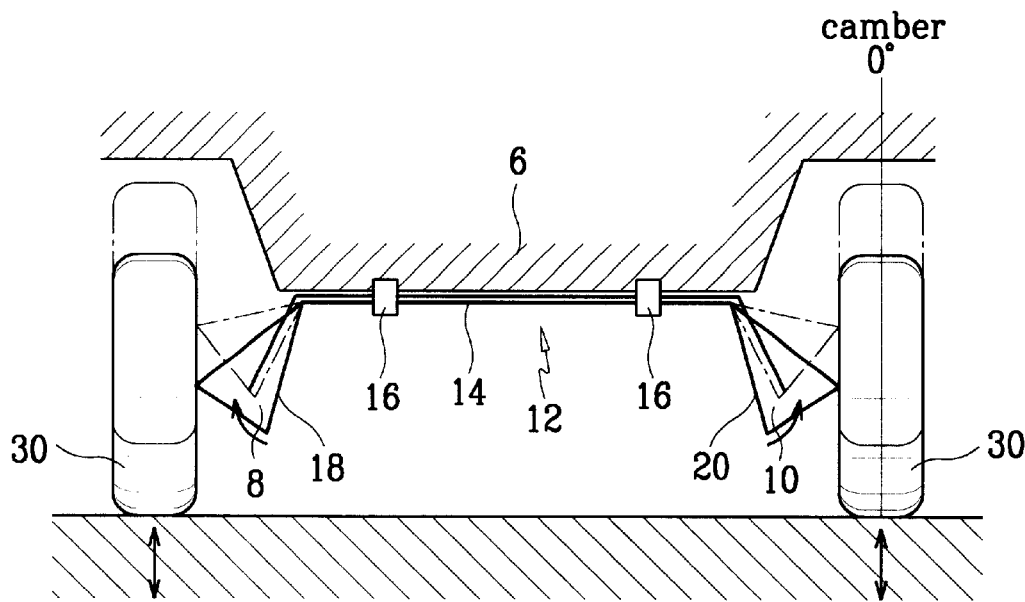
FIG. 3 shows the behavior of a vehicle equipped with the camber angle control type suspension system of FIG. 1 in a bump/rebound state.

When the vehicle runs straightforward, the wheels 30 of the vehicle bump and rebound due to uneven road surfaces so that the wheels 30 move upward and downward, as shown in FIG. 3. In this case, the trailing arm 12 supports the movement of the wheels 30 by pivotably moving up and down itself. That is, when the vehicle runs on an uneven road in a straightforward direction, generation of a camber angle which is positive in the bumping state and negative while rebounding can be prevented due to the opposite directional movement of the trailing arm 12. According to the operation of the trailing arm 12, the straightforward running stability of the vehicle can be improved.

Figure 4:
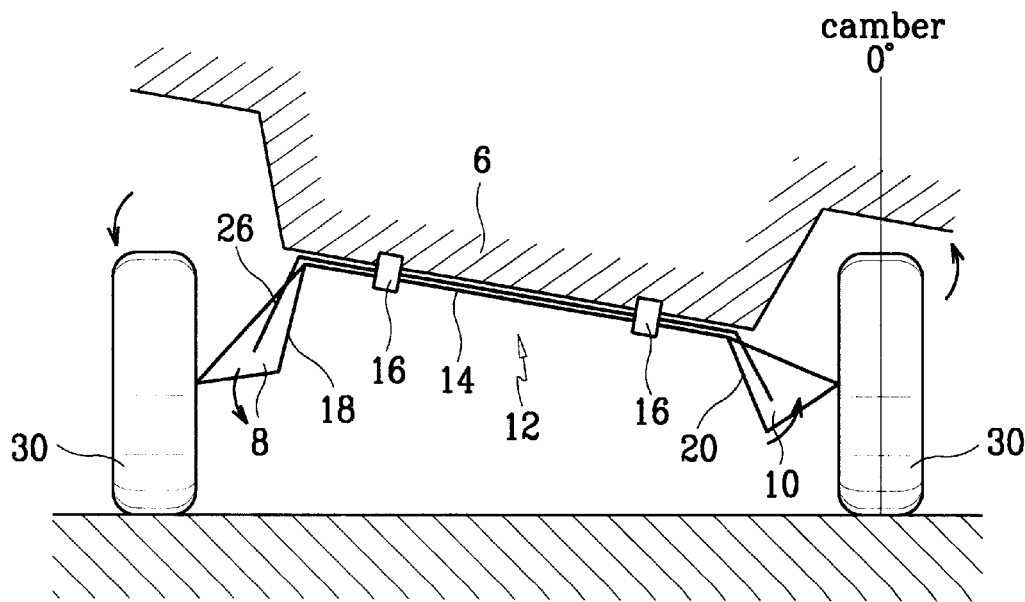
FIG. 4 shows the behavior of the vehicle of FIG. 3 while turning.

On the other hand, when the vehicle turns, the swing arms 8 and 10 pivot in opposite directions of each other on each elbow 18 and 20 such that each wheel maintains zero camber, as shown in FIG. 4. In this case, the stabilizer bar is twisted and the twist acts as a restoring force for the swing arms 8 and 10. According to the pivot movement of swing arms 8 and 10, the turning stability of the vehicle can be improved.

As described above, in the camber angle control type suspension system according to the present invention, the camber angle normally generated by the bump/rebound of the vehicle is prevented by the pivot movement of the trailing arm 12, and the camber angle normally generated by the turning motion of the vehicle is prevented by the pivot movement of the swing arms 8 and 10, such that the camber angle is always zero. This maintains an ideal contact surface between the tire and the ground regardless of the vehicle's directional condition and the unevenness of the road surface, and furthermore improves the vehicle's straightforward running stability and turning stability at the same time.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A camber angle control suspension system comprising:

left and right swing arms, each connected at one end to a respective left and right axle shaft;

a trailing arm having opposite ends with downwardly bent elbows which are pivotably connected to the swing arms, the trailing arm being rotatably connected to a vehicle body by means of rotatable bushings mounted on the trailing arm;

a shock absorber interposed between each swing arm and the vehicle body so as to make a connection therebetween;

springs coiled around the shock absorbers; and a stabilizer bar fixed at opposite ends to the left and right swing arms and connected to the vehicle body by means of rotatable bushings at acenter portion thereof.

* * * * *